United States Patent
Ott

(10) Patent No.: US 9,489,758 B2
(45) Date of Patent: Nov. 8, 2016

(54) METHOD CONTRIBUTING TO MAKING SAFE A SYNTHETIC GRAPHICS REPRESENTATION OF THE VIEW OUTSIDE AN AIRCRAFT

(71) Applicant: AIRBUS HELICOPTERS, Marignane (FR)

(72) Inventor: Adrien Ott, Salon de Provence (FR)

(73) Assignee: Airbus Helicopters, Marignane (FR)

( * ) Notice: Subject to any disclaimer, the term of this patent is extended or adjusted under 35 U.S.C. 154(b) by 0 days.

(21) Appl. No.: 14/723,694

(22) Filed: May 28, 2015

(65) Prior Publication Data

US 2015/0348299 A1 Dec. 3, 2015

(30) Foreign Application Priority Data

May 28, 2014 (FR) ...................... 14 01230

(51) Int. Cl.
*G09G 5/00* (2006.01)
*G06T 11/60* (2006.01)
(Continued)

(52) U.S. Cl.
CPC ............ *G06T 11/60* (2013.01); *G01C 23/005* (2013.01); *G06T 7/004* (2013.01); *H04N 7/183* (2013.01)

(58) Field of Classification Search
None
See application file for complete search history.

(56) References Cited

U.S. PATENT DOCUMENTS

| 4,698,785 A | 10/1987 | Desmond et al. |
| 5,335,177 A | 8/1994 | Boiteau et al. |

(Continued)

FOREIGN PATENT DOCUMENTS

| EP | 1875439 | 8/2008 |
| EP | 2169355 | 3/2010 |

(Continued)

OTHER PUBLICATIONS

French Search Report for French Application No. 1401230, Completed by the French Patent Office on Mar. 19, 2015, 8 pages.

*Primary Examiner* — Kyle Zhai
(74) *Attorney, Agent, or Firm* — Brooks Kushman P.C.

(57) ABSTRACT

A method of contributing to making safe a synthetic vision display of an aircraft for displaying on viewing means an at least partial view in perspective of the environment of the aircraft together with piloting symbology. During the method, at least one check point ($P_1$, $P_2$, $P_3$) is defined that is situated in the environment and that co-operates with a reference point (Pr) of the aircraft to form a first straight line ($D_P$). Thereafter, a first display function ($F_1$) is used to calculate display coordinates ($a_1,b_2$), ($a_2,b_2$), ($a_3,b_3$) for each check point ($P_1$, $P_2$, $P_3$) on the viewing means, and then the inverse $(F_2)^{-1}$ of a second display function ($F_2$) is used together with the display coordinates ($a_1,b_2$), ($a_2,b_2$), ($a_3,b_3$) to calculate a second straight line ($D_S$) passing through the reference point (Dr). Finally, the first and second lines ($D_P$, $D_S$) corresponding to a common check point ($P_1$, $P_2$, $P_3$) are compared in order to define whether the synthetic vision display is trustworthy.

16 Claims, 4 Drawing Sheets

(51) Int. Cl.
 *G06T 7/00* (2006.01)
 *H04N 7/18* (2006.01)
 *G01C 23/00* (2006.01)

(56) References Cited

U.S. PATENT DOCUMENTS

| | | |
|---|---|---|
| 7,212,175 B1 | 5/2007 | Magee et al. |
| 7,342,512 B2 | 3/2008 | Hedrick |
| 7,352,292 B2 | 4/2008 | Alter et al. |
| 7,609,200 B1 * | 10/2009 | Woodell .............. G01S 13/953 342/176 |
| 8,009,163 B2 | 8/2011 | Capircio et al. |
| 8,243,098 B2 | 8/2012 | Benito et al. |
| 8,812,865 B2 | 8/2014 | Ganille et al. |
| 2012/0203997 A1 | 8/2012 | Block |

FOREIGN PATENT DOCUMENTS

| | | |
|---|---|---|
| FR | 2670591 | 6/1992 |
| FR | 2963690 | 2/2012 |

* cited by examiner

METHOD CONTRIBUTING TO MAKING SAFE A SYNTHETIC GRAPHICS REPRESENTATION OF THE VIEW OUTSIDE AN AIRCRAFT

CROSS REFERENCE TO RELATED APPLICATION

This application claims priority to French patent application No. FR 14 01230 filed on May 28, 2014, the disclosure of which is incorporated in its entirety by reference herein.

BACKGROUND OF THE INVENTION (1) Field of the Invention

The present invention lies in the field of aircraft avionics, and in particular of visual devices for assisting in piloting and navigation.

The present invention relates to a method contributing to making safe a synthetic graphics representation of the view outside an aircraft, and to a synthetic vision device implementing such a method contributing to making it safe.

(2) Description of Related Art

Aircraft avionics provide the pilot and/or the copilot of an aircraft with a large amount of information both about aircraft parameters and flying conditions, and also about navigation. Recent progress in the field of avionics makes it possible in particular to display a synthetic graphics representation of the view outside the aircraft on viewing means, e.g. such as a screen installed in the cockpit of the aircraft or indeed a head-up vision system incorporated in the helmet of the pilot of the aircraft.

Such a synthetic graphics representation of the view outside the aircraft may be in perspective and it is generally constructed on the basis of mathematical functions and software means such as perspective tracing software. The graphics representation is based firstly on at least one database of the environment of the aircraft and secondly on the known position of the aircraft in that environment.

In particular, each database about the environment of the aircraft may include information about the terrain surrounding the aircraft together with the positions in the environment of various particular elements such as obstacles or landing zones, for example. The position of the aircraft may be obtained, among other ways, by means of a satellite locating device fitted to the aircraft.

Furthermore, this synthetic graphics representation may take account of the route of the aircraft, i.e. the direction in which the aircraft is flying, together with its heading, which defines the orientation of the aircraft, e.g. relative to magnetic north, and its attitude, which corresponds to its angles of inclination about roll, pitching, and yaw axes of the aircraft. The synthetic graphics representation is then oriented on the viewing means so as to be consistent with the real view of the aircraft pilot, in compliance with the heading and attitude information about the aircraft.

The roll, pitching, and yaw axes are axes that are characteristic of an aircraft. The roll axis extends in a longitudinal direction from the rear of the aircraft towards the front of the aircraft, the yaw axis extends upwards in an elevation direction perpendicularly to the longitudinal direction, and the pitching axis extends from left to right in a transverse direction that is perpendicular to the longitudinal direction and to the direction in elevation.

This heading and attitude information may for example be provided by a conventional attitude and heading reference system (AHRS).

The synthetic graphics representation of the view outside an aircraft is generally referred to as a synthetic vision system (SVS).

Furthermore, additional piloting information, sometimes referred to as "piloting symbology", may be superposed on the synthetic graphics representation. This piloting symbology comprises in particular attitude symbology showing attitude references and inclination references such as a horizon line symbol, an attitude scale on either side of the horizon line, and an inclination scale showing the pitching and roll of the aircraft. This attitude information is generally provided by the AHRS type means for determining heading and attitude and it is transcribed graphically on the viewing means with the help of a dedicated display function. The piloting symbology may also include particular marks corresponding for example to the position of landing zones or grounds situated in the environment of the aircraft.

By way of example, Document U.S. Pat. No. 7,352,292 describes a synthetic graphics representation system using a database and information from sensors on board the aircraft. That graphics representation is a combination of data coming from the sensors and information from the database. The database is also updated during flights of the aircraft using data coming from the sensors.

In addition, the display of the synthetic graphics representation and/or of the piloting symbology may be monitored in order to guarantee that the displayed information is valid. Such monitoring may be performed in various ways.

For example, a display may be made safe by a feedback mechanism, i.e. the initial data that generated the display is calculated from the displayed information and the results of the calculation are compared with the initial data.

Document FR 2 670 591 describes such a system for making safe piloting information of an aircraft. That system for making safe performs feedback calculation of navigation parameters on the basis of displayed information and compares the information as obtained in that way with the data coming directly from sensors of the aircraft. An alarm is then issued if a difference is reached that exceeds a predefined threshold. The calculation of the initially displayed information and the feedback calculation of the navigation parameters are both performed by the same function.

It is also possible to use two dissimilar channels for generating graphics in parallel in order to make such a display safe. It is then possible to compare those two graphics representations as generated in parallel, possibly by two distinct calculation means.

Document U.S. Pat. No. 7,342,512 describes a display system for an aircraft having a comparison computer for checking the display. The comparison computer performs calculation independently of the display device on a selection of points actually displayed on the basis of corresponding information supplied by the sensors used by the display device, and it compares the results with the points actually displayed. If a significant difference exists, then an error message is displayed.

In addition, Document U.S. Pat. No. 7,212,175 describes a system comparing information displayed on a viewing screen with data of the aircraft. If the displayed information and the aircraft data are different, then no information is displayed on the viewing screen.

Furthermore, Document EP 1 875 439 describes a graphics generator device having means for monitoring the display of the graphics generator device. The monitor means serve to prevent the use of certain functions that might generate the display of recurrent symbols. Those monitor means also make it possible to generate and monitor images that are dedicated to monitoring and to monitor certain variables of states internal to the graphics generator device.

Document U.S. Pat. No. 8,243,098 describes a device for displaying an authoritative image made up of a plurality of sub-images that are combined with one another. The authoritative image may be compared with an original image in order to validate the original image.

Document FR 2 963 690 describes a mechanism for making safe a client/server computer system serving firstly to prevent fortuitous triggering of a function and secondly to guarantee the integrity of functions and the consistency of information exchanged between the client and the server. That safety mechanism uses computer signatures and the installation of feedback circuits.

Also known is Document U.S. Pat. No. 4,698,785, which describes a method of detecting errors on a display. Information is initially displayed as a function of initial data supplied by a sensor with the data being transformed by a first function, and then "derived" data is calculated on the basis of this displayed information by using a second function, e.g. the inverse of the first function. The "derived" data is then compared with the initial data as supplied by a sensor in order to detect display errors, if any.

Finally, Documents EP 2 169 355 and US 2012/203997 relate to the technological background of the invention.

Furthermore, in the field of aircraft, standards specify safety conditions applicable to the various systems and devices used, e.g. to avionics systems, specifying in particular the effects of a fault on such a system. Five criticality levels for a system known as "design assurance levels" (DAL) are thus defined by the ARP4754A aviation standard and they are used for example in the DO-254 standard.

The DAL A level is the most critical level, where a fault can lead to a problem that is catastrophic and might cause the aircraft to crash. In contrast, the DAL E level is the least critical level, where a fault might give rise to a problem that has no effect on the flying safety of the aircraft.

As a result, avionics systems having the DAL A criticality level are trustworthy and designed to limit the risks of faults appearing. Such systems generally have monitoring and safety devices in order to detect the appearance of faults. Avionics systems having the DAL A criticality level are thus the safest and the most reliable systems of the aircraft.

The display of piloting symbology generally has a DAL A criticality level, since knowledge of the attitude of the aircraft is important or even essential in order to be able to control the flight of the aircraft, and consequently in order to fly in safety. Displaying piloting symbology must thus comply with the requirements for operating safety and integrity needed to allow it to be used as assistance in piloting and in navigating the aircraft.

In contrast, a synthetic graphics representation of the view outside an aircraft does not at present have a DAL A criticality level. In particular, the orientation of the representation in perspective on the viewing means of the aircraft, which involves taking account of the heading and the attitude of the aircraft, is not monitored. Consequently, it is not guaranteed that the representation is properly positioned relative to the heading and the attitude of the aircraft. As a result, this synthetic graphics representation does not satisfy the requirements for operating safety, integrity, and reliability that are necessary for it to be used as assistance in piloting and in navigation.

Thus, the synthetic graphics representation of the view outside an aircraft should be taken into account merely as information made available to the pilot of the aircraft, but without being used for assistance in piloting or in navigation. Such a synthetic graphics representation is nowadays generally compliant with a DAL C criticality level.

BRIEF SUMMARY OF THE INVENTION

An object of the present invention is thus to propose a method of contributing to making safe a synthetic graphics representation of the view outside an aircraft, which, when used in common with other methods or indeed other means that are independent and additional thereto, makes it possible to claim that the display complies with a DAL A or DAL B criticality level. This synthetic graphics representation thus benefits from an operating safety, integrity, and reliability level that is sufficient for it to be used for assistance in piloting and in navigation.

Such methods or means that are additional and independent that make it possible to claim that the display complies with such a criticality level are constituted, for example, by a method or means of the aircraft for satellite positioning, a method or means for determining heading and attitude, such as means of the AHRS type, and a database of the environment of the aircraft. Such a database of the environment of the aircraft may be a terrain, navigation, or indeed obstacles database.

The present invention provides a method contributing to making safe a synthetic graphics representation of the view outside an aircraft, the aircraft having at least one viewing means on which there can be displayed firstly an at least partial view in perspective of the environment of the aircraft and secondly piloting symbology.

The aircraft is characterized by three leading directions, namely the roll, pitching, and yaw axes. The roll axis extends along a longitudinal direction from the rear of the aircraft towards the front of the aircraft, the yaw axis extends along an elevation direction upwards perpendicularly from the longitudinal direction, and the pitching axis extends along a transverse direction from right to left perpendicularly to the longitudinal and elevation directions. Furthermore, the heading of the aircraft corresponds to the roll axis of the aircraft.

During this method contributing to making safe a synthetic graphics representation of the view outside an aircraft, the following steps are performed:

determining at least the heading and the attitude of the aircraft and a reference point Pr of the aircraft characterized by first coordinates in a terrestrial reference frame;

defining at least one check point $P_1$, $P_2$, $P_3$ situated in the environment of the aircraft, each check point $P_1$, $P_2$, $P_3$ forming together with the reference point Pr a respective first straight line $D_{P1}$, $D_{P2}$, $D_{P3}$, the position of each first line $D_{P1}$, $D_{P2}$, $D_{P3}$ being known relative to the roll, pitching, and yaw axes of the aircraft;

using a first display function $F_1$ to calculate the display coordinates $(a_1,b_1)$, $(a_2,b_2)$, $(a_3,b_3)$ of each check point $P_1$, $P_2$, $P_3$ on the viewing means;

using the inverse $(F_2)^{-1}$ of a second display function $F_2$ and the display coordinates $(a_1,b_1)$, $(a_2,b_2)$, $(a_3,b_3)$ corresponding to each check point $P_1$, $P_2$, $P_3$ to calculate a second straight line $D_{S1}$, $D_{S2}$, $D_{S3}$ passing via the reference point Pr of the aircraft, the first display function $F_1$ and the second display function $F_2$ being distinct;

comparing each first line $D_{P1}$, $D_{P2}$, $D_{P3}$ with the second line $D_{S1}$, $D_{S2}$, $D_{S3}$ corresponding to the same check point $P_1$, $P_2$, $P_3$; and defining that the at least partial view in perspective of the environment of the aircraft is trustworthy if each first line $D_{P1}$, $D_{P2}$, $D_{P3}$ and each second line $D_{S1}$, $D_{S2}$, $D_{S3}$ corresponding to the same check point $P_1$, $P_2$, $P_3$ presents an angular difference that is less than or equal to a predetermined margin.

Under such conditions, the aircraft has a synthetic vision device displaying a synthetic graphics representation of the view outside an aircraft. This synthetic graphics representation of the view outside an aircraft is displayed on at least one viewing means of the aircraft and represents, amongst other things, an at least partial view in perspective of the environment outside the aircraft shown as a background to piloting symbology. This at least partial view in perspective of the environment outside the aircraft consists in a representation of the surrounding terrain, possibly also with particular elements such as landing zones or grounds, or buildings. This at least partial view in perspective of the environment outside the aircraft is oriented by taking account of the heading and the attitude of the aircraft so as to be representative, for example, of the direct vision of the environment that the pilot of the aircraft has through a transparent windshield of the aircraft. In another representation used during particular flight stages of the aircraft, the display reference may be the instantaneous route followed by the aircraft instead of and taking the place of its heading. By way of example, this viewing means may be a screen or a head-up display device.

The method of the invention uses the heading and the attitude of the aircraft, which constitutes information needed by the pilot of the aircraft in order to pilot the aircraft effectively and with confidence. By way of example, the heading and the attitude of the aircraft are provided by an AHRS type means on board the aircraft. The heading is generally characterized by a direction in a terrestrial reference frame and the attitude is generally characterized by angles relative to the roll, pitching, and yaw axes of the aircraft. The directions of these roll, pitching, and yaw axes generally constitute a local reference frame tied to the aircraft and they are also known in the terrestrial reference frame, e.g. by virtue of the AHRS type means and by virtue of satellite positioning means on board the aircraft.

By using such means of the AHRS type for determining the heading and the attitude and such satellite positioning means, the position and the orientation of the local reference frame tied to the aircraft are known in the terrestrial reference frame. Consequently, it is possible to transpose the coordinates of any point from one reference frame to the other. The heading and the attitude of the aircraft are thus known in the terrestrial reference frame.

The reference point Pr of the aircraft is a fixed point of the aircraft that may be an arbitrary point of the aircraft or indeed a particular point of the aircraft such as its center of gravity, the position of an occupant's head (in particular the position of the pilot's head), or the center of the display device being used. This reference point Pr is preferably used as the reference for the display of the synthetic graphics representation of the view outside the aircraft. Since this reference point Pr is a fixed point of the aircraft, it is known in the local reference frame tied to the aircraft. This reference point Pr may also be the center of this local reference frame tied to the aircraft, e.g. formed by the roll, pitching, and yaw axes of the aircraft. The position of this reference point Pr may also be calculated in the terrestrial reference frame and characterized by first coordinates in the terrestrial reference frame.

The method of the invention also uses at least one check point $P_1$, $P_2$, $P_3$, each check point $P_1$, $P_2$, $P_3$ corresponding to a point situated in the environment of the aircraft. Each check point $P_1$, $P_2$, $P_3$ is used to verify the reliability and the accuracy of the at least partial view in perspective of the environment outside the aircraft. Together with the reference point Pr, each check point $P_1$, $P_2$, $P_3$ forms a respective first straight line $D_{P1}$, $D_{P2}$, $D_{P3}$. The position and the orientation of each first line $D_{P1}$, $D_{P2}$, $D_{P3}$ can be determined in the local reference frame tied to the aircraft. Likewise, the position of each check point $P_1$, $P_2$, $P_3$ can be determined in the local reference frame tied to the aircraft. Furthermore, the position of each check point $P_1$, $P_2$, $P_3$ and the position of the orientation of each first line $D_{P1}$, $D_{P2}$, $D_{P3}$ can be calculated in the terrestrial reference frame.

Each check point $P_1$, $P_2$, $P_3$ may be a known point in a database stored in a memory on board the aircraft, e.g. in a terrain, navigation, or obstacles database. This memory may be incorporated in or connected to a navigation device or indeed the synthetic vision display device. The second coordinates of each check point $P_1$, $P_2$, $P_3$ are then known in the terrestrial reference frame by using the database. Together with the reference point Pr, each check point $P_1$, $P_2$, $P_3$ thus forms a first straight line $D_{P1}$, $D_{P3}$, $D_{P3}$. Each first line $D_{P1}$, $D_{P2}$, $D_{P3}$ is then determined from first coordinates of the reference point Pr and second coordinates of each check point $P_1$, $P_2$, $P_3$ in the terrestrial reference frame. Consequently, the position and the orientation of each first line $D_P$ are known relative to the heading of the aircraft in the terrestrial reference plane. Furthermore, the position of each check point $P_1$, $P_2$, $P_3$ and the position and the orientation of each first line $D_{P1}$, $D_{P2}$, $D_{P3}$ can also be determined in the local reference frame tied to the aircraft.

Each check point $P_1$, $P_2$, $P_3$ can also be defined by a first line $D_{P1}$, $D_{P2}$, $D_{P3}$ positioned relative to the heading of the aircraft in the local reference plane tied to the aircraft and passing through the reference point Pr of the aircraft, together with a distance L from the reference point Pr. Each first line $D_P$ can be characterized by an angle relative to the heading direction of the aircraft. The first coordinates of the reference point Pr and the position of the heading of the aircraft are known in the local reference frame tied to the aircraft, so the second coordinates of each check point $P_1$, $P_2$, $P_3$ situated respectively on each of the lines $D_{P1}$, $D_{P2}$, $D_{P3}$ at a distance L from the reference point Pr can be determined in this local reference frame tied to the aircraft. The distance L is preferably the same along each first line $D_P$, even though it is possible to define a specific distance L for each first line $D_{P1}$, $D_{P2}$, $D_{P3}$.

Furthermore, the position and the orientation of each first line $D_{P1}$, $D_{P2}$, $D_{P3}$ and the position of each check point $P_1$, $P_2$, $P_3$ can also be calculated in the terrestrial reference frame.

Preferably, the first lines $D_{P1}$, $D_{P2}$, $D_{P3}$ are defined in the field of the at least partial view in perspective of the environment of the aircraft displayed on the viewing means, generally corresponding also to the field of vision of the pilot. The term "field of the at least partial view in perspective of the environment of the aircraft" is used to mean the zone of the environment of the aircraft that is displayed on the viewing means. Specifically, in order to display such an at least partial view in perspective of the environment of the aircraft, a computer limits itself generally to this field of the at least partial view in perspective of the environment in order to limit calculation time. This applies in particular for a synthetic graphics representation of the SVS type. As a result, only coordinates present in this field of this at least partial view in perspective can be used by the method of the invention.

The method of the invention then makes it possible to calculate the display coordinates $(a_1,b_1)$, $(a_2,b_2)$, $(a_3,b_3)$ of each check point $P_1$, $P_2$, $P_3$ on the viewing means by using a first display function $F_1$. Each viewing means is generally a display of given size and generally comprises pixels arranged in horizontal rows and vertical columns. As a result, any element shown in the display can be characterized by display coordinates (x,y) in a fixed reference frame tied to the display, x being a column number and y being a row number, for example.

Consequently, each pair of display coordinates $(a_1,b_1)$, $(a_2,b_2)$, $(a_3,b_3)$ represents a respective one of the check points $P_1$, $P_2$, $P_3$ displayed on the viewing means while taking account of the heading and the attitude of the aircraft.

The first display function $F_1$ make it possible, for example, to display on the viewing means a graphics representation of the terrain surrounding the aircraft and/or of particular elements such as a landing ground, with this being done on the basis of their positions as known in the terrestrial reference frame. The first display function $F_1$ may also serve to display piloting symbology on the viewing means. This first display function $F_1$ takes account of the heading and the attitude of the aircraft in order to display this graphics representation of the terrain surrounding the aircraft so as to be representative of the pilot's vision.

When the reference point Pr is the display reference of the synthetic graphics representation of the view outside the aircraft, the display coordinates $(a_1,b_1)$, $(a_2,b_2)$, $(a_3,b_3)$ of each check point $P_1$, $P_2$, $P_3$ correspond respectively to the points of intersection between each of the first straight lines $D_{P1}$, $D_{P2}$, $D_{P3}$ and the synthetic outside scene represented on the viewing means.

It is then possible using the inverse $(F_2)^{-1}$ of a second display function $F_2$ and using the display coordinates $(a_1,b_1)$, $(a_2,b_2)$, $(a_3,b_3)$ of each check point $P_1$, $P_2$, $P_3$ to calculate a second straight line $D_S$ for each check point $P_1$, $P_2$, $P_3$.

The second display function $F_2$ serves, for example, to display piloting symbology on the viewing means. This second display function $F_2$ also takes account of the heading and the attitude of the aircraft in order to display the piloting symbology.

Consequently, the inverse $(F_2)^{-1}$ of the second display function $F_2$ can make it possible, starting from a point $C_1$ displayed on the viewing means and known for example by its display coordinates (x,y), to determine at least the straight line Dc passing through the reference point Pr and the point $C_2$ of the environment of the aircraft corresponding to the point $C_1$ displayed on the viewing means. Furthermore, if the distance between the point $C_2$ and the reference point Pr is known, then the position of the point $C_2$ can be defined accurately on the line Dc.

In addition, when the reference point Pr is the display reference of the synthetic graphics representation of the view outside the aircraft, the line Dc passes directly through the reference point Pr and the point $C_1$ displayed on the viewing means.

Thus, each second line $D_{S1}$, $D_{S2}$, $D_{S3}$ passes via the reference point Pr of the aircraft and must also pass through a check point $P_1$, $P_2$, $P_3$ corresponding to a pair of display coordinates $(a_1,b_1)$, $(a_2,b_2)$, $(a_3,b_3)$ on the display means. As a result, the position and the orientation of each second line $D_S$ are known in the terrestrial reference frame by using this second display function $F_2$. Consequently, each second line $D_S$ can be positioned relative to the heading of the aircraft, given that the coordinates of the reference point Pr and the orientation of the heading of the aircraft are known in the terrestrial reference frame. As a result, the second display function $F_2$ is used to perform a calculation that is the inverse of that performed using the first display function $F_1$.

In addition, the position and the orientation of each second line $D_S$ can also be calculated in the local reference frame tied to the aircraft.

Consequently, the method of the invention makes it possible to compare the first and second straight lines $D_P$, $D_S$ that pass through the same check point $P_1$, $P_2$, $P_3$. The first line $D_P$ and the second line $D_S$ passing through a particular check point $P_1$, $P_2$, $P_3$ should theoretically coincide, since both of them pass through the reference point Pr and through the same one of the check points $P_1$, $P_2$, $P_3$.

In practice, these lines are in fact close but distinct as a result of the different approximations used during the calculation step for determining the display coordinates $(a_1,b_1)$, $(a_2,b_2)$, $(a_3,b_3)$ of the check points $P_1$, $P_2$, $P_3$ and then for calculating the second line $D_{S1}$, $D_{S2}$, $D_{S3}$.

Furthermore, the method of the invention contributing to making safe seeks to constitute an element that contributes to validating the synthetic graphics representation of the view outside an aircraft in order to make it possible, in association with other means that are additional and independent, to achieve a level of operating safety, integrity, and reliability that is sufficient for the synthetic graphics representation to be used for assistance in piloting and navigation. The first and second display functions $F_1$ and $F_2$ are distinct so as to present dissimilarity in these display functions $F_1$ and $F_2$. Consequently, the calculations performed by the first display function $F_1$ and then by the second display function $F_2$ make it possible to obtain a level of integrity and reliability that is greater than that which would be obtained using a single common display function $F_1$ or $F_2$.

As a result, since the two display functions $F_1$ and $F_2$ are distinct, they can give results that are slightly different, because of the formulae, methods of calculation, and/or approximations that may be used in each of the display functions $F_1$ and $F_2$, even though the results delivered by these two display functions $F_1$ and $F_2$ are correct.

Consequently, it is possible for an angular difference to exist between the first and second straight lines $D_P$, $D_S$ corresponding to the same check point $P_1$, $P_2$, or $P_3$, this angular difference being characterized by an angle between the first line $D_P$ and the second line $D_S$. If this angular difference is less than or equal to a predetermined margin, then it can be decided that the two display functions $F_1$ and $F_2$ are providing results that are consistent. In contrast, when the angular difference is greater than the predetermined margin, then the two display functions $F_1$ and $F_2$ are providing results that are inconsistent.

The predetermined margin is determined as being the maximum angular difference that is considered as being acceptable on the basis of the respective mathematical approximations used by the two display functions $F_1$ and $F_2$, and on the basis of their respective latency times in order to assume that the first and second lines $D_P$ and $D_S$ coincide. By way of example, the predetermined margin may have a value of one degree (1°).

Furthermore, the two display functions $F_1$ and $F_2$ may have different safety levels, one of the display functions $F_1$, $F_2$ having a safety level that is higher than the other display function $F_1$, $F_2$. If both display functions $F_1$ and $F_2$ are consistent, i.e. if the angular difference between the first and second lines $D_P$ and $D_S$ corresponding to a single check point $P_1$, $P_2$, $P_3$ is less than or equal to the predetermined margin, then it can be considered that the display function $F_1$, $F_2$ having the higher safety level is an element that contributes to improving the integrity of the other function $F_1$, $F_2$. Used in association with other means that are additional and independent, the two display functions $F_1$ and $F_2$ can advantageously be considered as having the higher of the safety levels of these two display functions $F_1$, $F_2$, for example the second display function $F_2$ may have the higher level, thereby validating the first display function $F_1$.

Consequently, when the first and second lines $D_P$ and $D_S$ passing through the same check point $P_1$, $P_2$, $P_3$ are consistent, i.e. when the angular difference between them is less than or equal to a predetermined margin, it can be decided that the at least partial view in perspective of the environment of the aircraft is correct. Furthermore, in compliance with the higher safety level achieved by one of the display functions $F_1$, $F_2$, the at least partial view in perspective of the environment of the aircraft can be defined as being trustworthy and reliable.

Preferably, only one of said display functions $F_1$, $F_2$ has a DAL A or DAL B criticality level. Advantageously, and as mentioned above, it can then be assumed that both display functions $F_1$ and $F_2$ have a DAL A or DAL B criticality level and it is possible to deduce therefrom that the method of the invention contributing to making safe a synthetic graphics representation of the view outside the aircraft contributes to obtaining a DAL A or DAL B criticality level.

Consequently, in association with other additional independent means, this synthetic graphics representation of the outside view of an aircraft can then be used to provide assistance in piloting and navigating the aircraft with sufficiently high operating safety, integrity, and reliability levels being achieved by the method of the invention contributing to safety.

In a first implementation of this method contributing to making safe a synthetic graphics representation of the view outside an aircraft, the first display function $F_1$ is a function for displaying the at least partial view in perspective of the environment of the aircraft on the viewing means, and the second display function $F_2$ is a function for displaying the piloting symbology on the viewing means.

The first display function $F_1$ then makes it possible to calculate the display coordinates (x,y) on the viewing means for all points of the environment in compliance with the information contained in at least one database. This first display function $F_1$ performs this calculation of the display coordinates (x,y) while taking account firstly of a vision angle from the reference point of the display of the synthetic graphics representation of the view outside the aircraft, which is preferably the reference point Pr, and secondly of the heading and the attitude of the aircraft. This first display function $F_1$ thus enables the pilot of the aircraft to have a synthetic graphics representation on the viewing means of the view outside the aircraft that is consistent with the real view the pilot can have through the transparent windshield of the aircraft.

In contrast, the second display function $F_2$ serves to display piloting symbology on the viewing means, including in particular attitude symbology representing the attitude and inclination angles of the aircraft as obtained by AHRS type means for determining heading and attitude, and also piloting symbologies such as for example a speed vector of the aircraft.

In a second implementation of this method of the invention contributing to making safe, the first display function $F_1$ is a function for displaying the piloting symbology on the viewing means and the second display function $F_2$ is a function for displaying the at least partial view in perspective of the environment of the aircraft on the viewing means.

In a preferred implementation of this method contributing to making safe a synthetic graphics representation of the view outside an aircraft, the first display function $F_1$ is a function for displaying the at least partial view in perspective of the environment of the aircraft on the viewing means having a DAL C criticality level, while the second display function $F_2$ is a function for displaying the piloting symbology on the viewing means and has a DAL A criticality level.

Finally, when the at least partial view in perspective of the environment outside the aircraft is not trustworthy, i.e. when the angular difference between the first and second straight lines $D_P$, $D_S$ is greater than the predetermined margin, the display of the at least partial view in perspective on the viewing means is modified. This modification thus informs the pilot of the aircraft that the at least partial view in perspective of the outside environment of the aircraft cannot be used to provide assistance in piloting and navigation. For example, the at least partial view in perspective of the outside environment may be shaded or darkened or indeed not displayed. This view may then be replaced by a separator line of the conventional artificial horizon type or by a "wide field" artificial horizon.

In contrast, when the at least partial view in perspective of the environment outside the aircraft is trustworthy, i.e. when the angular difference between the first and second straight lines $D_P$, $D_S$ is less than or equal to the predetermined margin, the at least partial view in perspective is displayed on the viewing means. The pilot of the aircraft can then use the at least partial view in perspective of the environment outside the aircraft to provide assistance in piloting and navigation.

Furthermore, during the method of the invention for contributing to making safe, it is possible to use one or more check points $P_1$, $P_2$, $P_3$ in order to verify the integrity of the at least partial view in perspective of the environment outside the aircraft.

The use of a single check point $P_1$ is sufficient to verify the reliability and the accuracy of the display of that check point $P_1$ of the environment on the at least partial view in perspective of the environment of the aircraft. If the result of this check is positive, it can then be assumed that all of the points of the environment of the aircraft situated on this first line $D_{P1}$ formed by this check point $P_1$ and the reference point are likewise represented in reliable and accurate manner on the at least partial view in perspective of the environment of the aircraft.

The use of a plurality of check points $P_1$, $P_2$, $P_3$ makes it possible to check the reliability and the accuracy of the display of those check points $P_1$, $P_2$, $P_3$ of the environment on the at least view in perspective of the environment of the aircraft. If the result of this check is positive for all of the check points $P_1$, $P_2$, $P_3$, it can then be assumed that all of the points of the environment of the aircraft situated on the first lines $D_{P1}$, $D_{P2}$, $D_{P3}$ formed by each of the check points $P_1$, $P_2$, $P_3$ and the reference point Pr are likewise represented in reliable and accurate manner on the at least partial view in perspective of the environment of the aircraft. In general, these check points $P_1$, $P_2$, $P_3$ in association with the reference point Pr form first straight lines that are not coplanar, so this result can be extended to all of the points in the environment of the aircraft.

Nevertheless, increasing the number of check points $P_1$, $P_2$, $P_3$ involves increasing the calculation time needed to perform this verification and also involves using calculation means that may be detrimental to other functions that also require greater or smaller use of the calculation means.

The three check points $P_1$, $P_2$, $P_3$ are preferably selected in the field of the at least partial view in perspective of the environment of the aircraft so as to form together with the reference point Pr three first straight lines $D_{P1}$, $D_{P2}$, $D_{P3}$ that are not coplanar. The method of contributing to making safe a synthetic graphics representation of the view outside an aircraft then constitutes an element contributing to improving the integrity of this synthetic graphics representation of the view outside the aircraft. These three check points $P_1$, $P_2$, $P_3$ can be selected randomly in this field of the at least partial view in perspective of the environment of the aircraft, or they may be selected along three predefined first straight lines $D_{P1}$, $D_{P2}$, $D_{P3}$.

In an example in which, together with the reference point Pr, the three check points $P_1$, $P_2$, $P_3$ form three first lines $D_{P1}$, $D_{P2}$, $D_{P3}$ that are not coplanar, a first check point $P_1$ is situated on a first line $D_{P1}$ situated in a plane containing the roll and pitching axes of the aircraft and oriented at an angle of −10° relative to the roll axis in this plane. A second check point $P_2$ is defined by a first line $DP_2$ situated in the same plane and oriented at an angle of +10° relative to the roll axis. A third check point $P_3$ is defined by a first line $D_{P3}$ situated in a plane containing the roll and yaw axes of the aircraft and oriented at an angle of −10° relative to the roll axis in this plane. These three points $P_1$, $P_2$, $P_3$ are situated at a distance L from the reference point Pr. The distance L has a value of 10 nautical miles (10 Nm).

Furthermore, the method of the invention may include a verification stage during which the check points $P_1$, $P_2$, $P_3$ are selected in succession in order to scan all of the at least partial view in perspective of the environment of the aircraft. This verification stage serves to verify that the at least partial view in perspective is trustworthy throughout. The check points $P_1$, $P_2$, $P_3$ scan over the entire at least partial view in perspective over a limited time interval, this given time interval having a duration of one second (1 s), for example.

The present invention also provides a synthetic vision display device for an aircraft. This synthetic vision display device comprises at least one viewing means, at least one memory, and a calculator. The memory stores calculation instructions and at least one database of the environment of the aircraft such as a terrain, navigation, and/or obstacles database. The synthetic vision display device is suitable for being connected to at least one positioning means of the aircraft making it possible in particular to determine at least the heading and the attitude of the aircraft and also to determine a reference point Pr of the aircraft. The aircraft may in particular include satellite positioning means and/or AHRS type means for determining heading and attitude.

The synthetic vision display device then serves to display on at least one viewing means firstly an at least partial view in perspective of the environment of the aircraft and secondly piloting symbology.

The synthetic vision display device is also capable of performing the above-described method of contributing to making safe a synthetic graphics representation of the view outside an aircraft in order to make safe the display of the at least partial view in perspective of the environment of the aircraft. In association with other means that are additional and independent, the synthetic vision display device and more particularly the at least partial view in perspective of the environment of the aircraft can then be used to provide assistance in piloting and in navigating the aircraft.

Viewing means of this synthetic vision display device may comprise a screen arranged on an instrument panel of the aircraft or else a head-up display device. Such a head-up display device may for example be incorporated in the aircraft pilot's helmet, the viewing means then being a clear sight unit installed in the cockpit, or the pilot's visor, or an optical element arranged in front of at least one of the pilot's eyes.

The present invention also provides an aircraft including such a synthetic vision display device and at least one positioning means.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which.

Elements present in a plurality of different figures are given the same references in each of them.

DETAILED DESCRIPTION OF THE INVENTION

Figure 1:
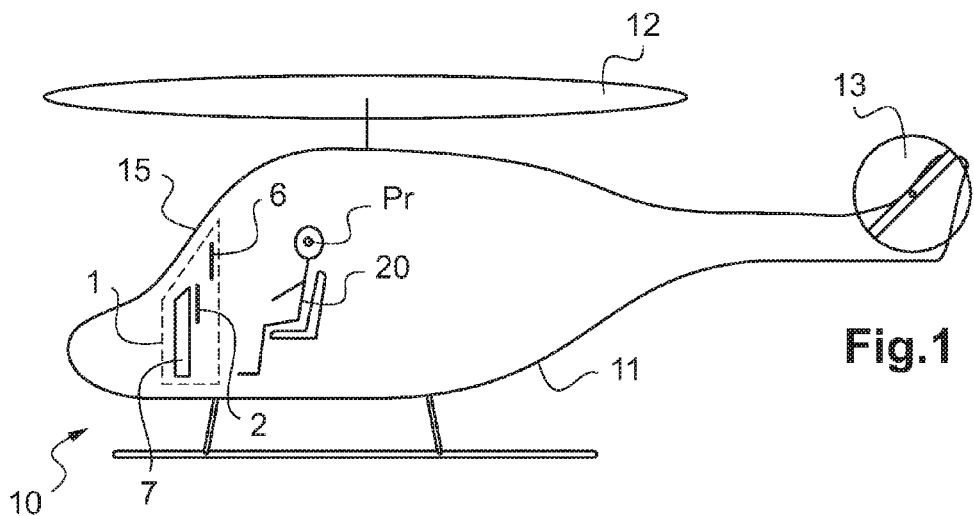
FIG. 1 shows an aircraft having a synthetic vision display device.
Figure 2:
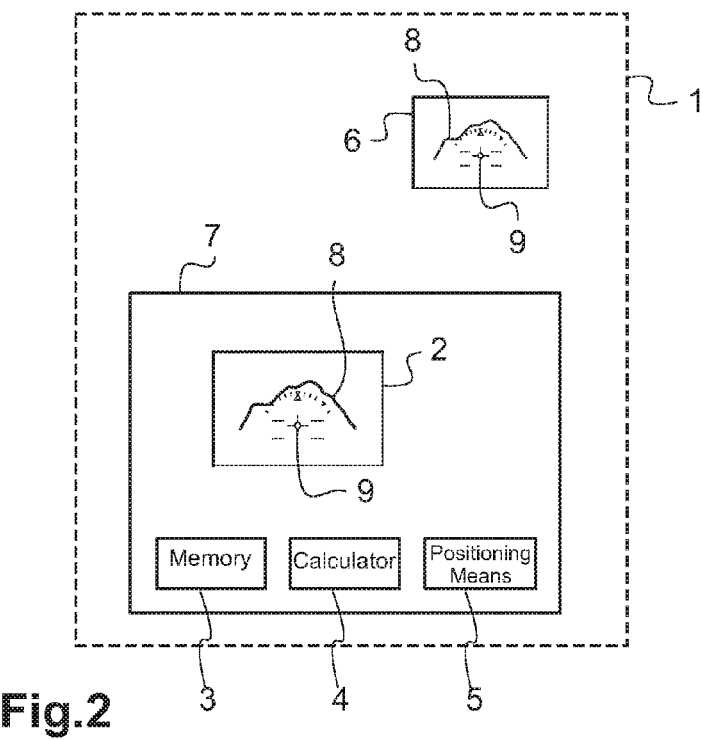
FIG. 2 shows a synthetic vision display device.

FIG. 1 shows a rotary wing aircraft 10 comprising a fuselage 11, a main rotor 12, a tail rotor 13, and a synthetic vision display device 1. A pilot 20 is installed on board the aircraft 10, and more precisely in a cockpit of the aircraft 10 and can look at the environment outside the aircraft 10 through a transparent windshield 15. Such a synthetic vision display device 1 is shown in greater detail in FIG. 2.

The synthetic vision display device 1 comprises a plurality of viewing means including a main screen 2 and a secondary screen 6. The main screen 2 is positioned on an instrument panel 7 of the aircraft 10, while the secondary screen 6 is positioned facing the pilot's head 20, and thus constitutes a head-up device. The pilot 20 can thus see the information displayed on this secondary screen 6 without turning the head and thus without glancing away from the environment outside the aircraft 10 as seen through the windshield 15. This synthetic vision display device 1 also has a memory 3, a calculator 4, and positioning means 5.

The memory 3 serves to store one or more databases concerning the environment outside the aircraft 10 together with calculation instructions. These calculation instructions may be in the form of a computer program and they are used by the calculator 4.

The positioning means 5 comprise satellite positioning means and means of the AHRS type for determining heading and attitude.

Figure 3:
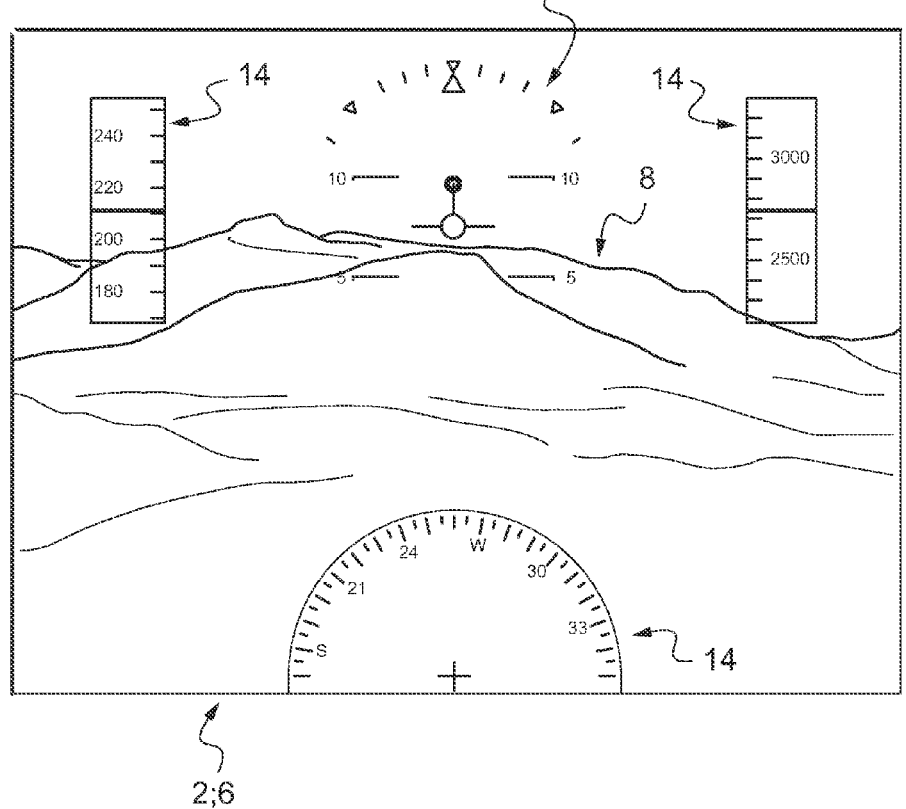
FIG. 3 shows a synthetic graphics representation of the view outside an aircraft.

FIG. 3 shows an example of the display on the viewing means 2, 6 where the pilot 20 of the aircraft 10 can see firstly an at least partial view 8 in perspective of the environment outside the aircraft 10, and secondly piloting symbology 9 for the aircraft 10. The at least partial view 8 in perspective of the environment outside the aircraft 10 consists in a representation of the surrounding terrain, possibly with particular elements such as landing zones or grounds, and/or buildings. In this display example, the pilot 20 can also see various items of flight and navigation information 14 such as the altitude of the aircraft 10 and its heading 16.

The at least partial view 8 in perspective of the environment outside the aircraft 10 takes account of the heading and the attitude of the aircraft 10, the heading 16 being the roll axis of the aircraft 10 and its attitude corresponding to its angles of inclination about its roll, pitching, and yaw axes. Furthermore, this at least partial view 8 in perspective makes use of a reference point Pr corresponding to the display reference of this view. This reference point Pr is situated at the level of the head of the pilot 20 of the aircraft 10, as shown in FIG. 1. Thus, the at least partial view 8 in perspective is representative of the direct vision that the pilot 20 has of the environment outside the aircraft 10 through the windshield 15.

Figure 4:
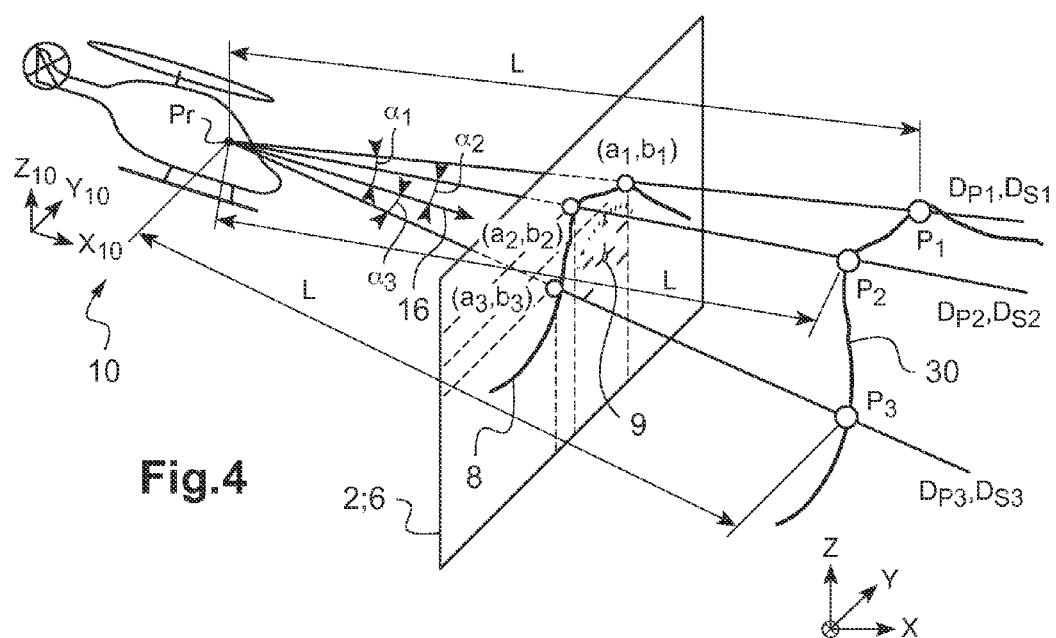
FIG. 4 is a view of the aircraft, of the viewing means, and of the surrounding terrain.

FIG. 4 is a perspective view shown the aircraft 10, the viewing means 2, 6, and the terrain 30 surrounding the aircraft 10 and located more particularly in front of the aircraft 10. A terrestrial reference frame (X, Y, Z) is tied to the terrain 30. A local reference frame $(X_{10}, Y_{10}, Z_{10})$ tied to the aircraft 10 is formed by the directions of the roll axis $X_{10}$, pitching axis $Y_{10}$, and yaw axis $Z_{10}$ of the aircraft 10.

Figure 5:
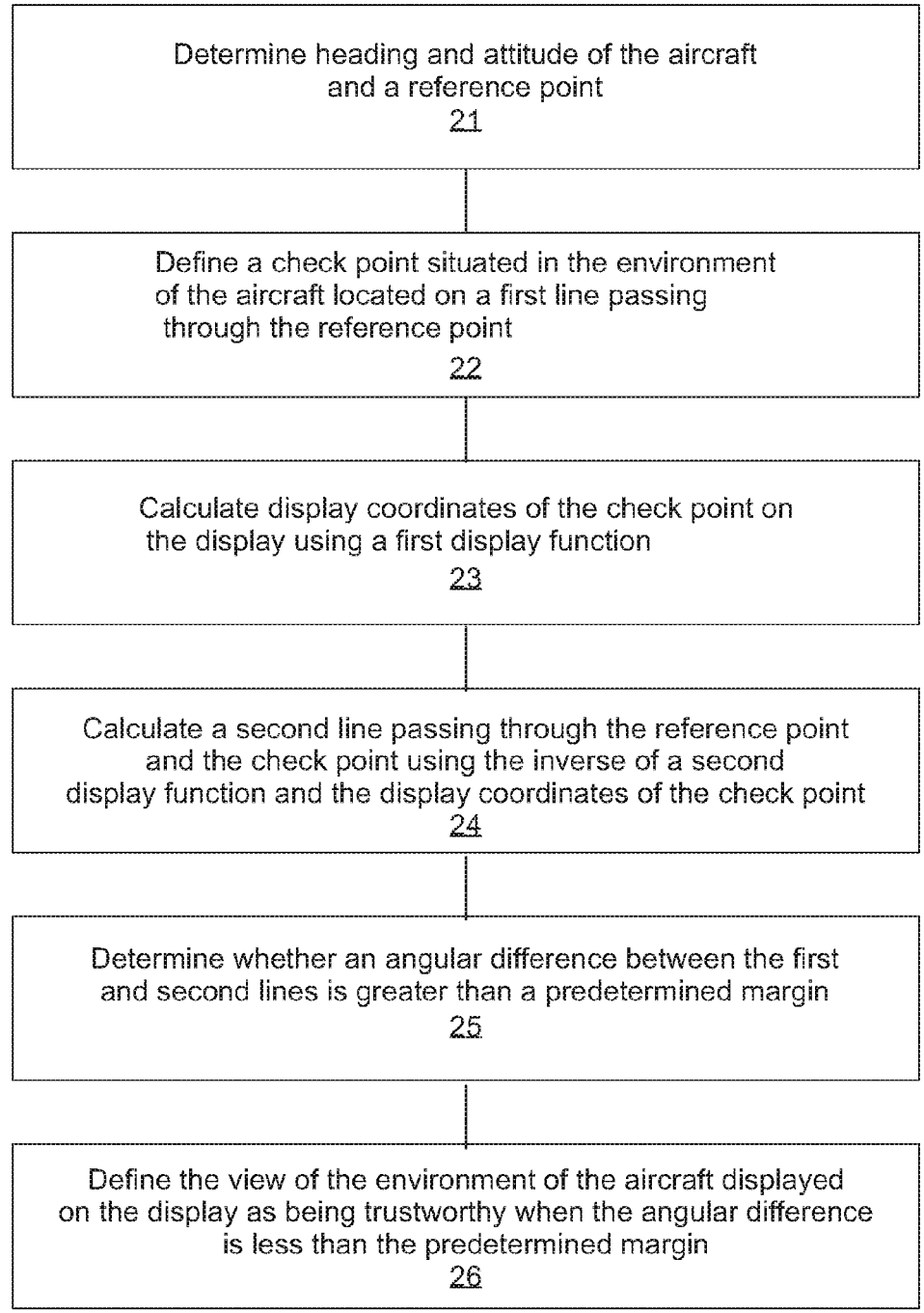
FIG. 5 is a view summarizing a method contributing to making safe a synthetic graphics representation of the view outside an aircraft.

FIG. 5 is a summary of a method contributing to making safe a synthetic graphics representation of the view outside the aircraft 10. This method contributing to safety acts in association with other means that are additional and independent to verify the integrity of the synthetic graphics representation displayed by the synthetic vision display device 1 and it comprises six successive steps.

By way of example, the additional and independent means are the satellite positioning means and the AHRS type heading and attitude determination means included in the positioning means 5 together with the database(s) of the environment outside the aircraft 10 and stored in the memory 3.

During a first step 21, the heading 16 and the attitude of the aircraft 10 are determined by the AHRS type heading and attitude determination means, and the reference point Pr is determined by the satellite positioning means. The heading 16, the attitude of the aircraft 10, and the reference point Pr are thus known both in the local reference frame $(X_{10}, Y_{10}, Z_{10})$ of the aircraft 10 and in the terrestrial reference frame (X, Y, Z) because of the positioning means 5.

Because of its positioning means 5, the position and the orientation of the local reference frame $(X_{10}, Y_{10}, Z_{10})$ in the terrestrial reference frame (X, Y, Z) are known. It is thus possible to transpose the coordinates of any point from one reference frame to the other.

During a second step 22, three check points $P_1$, $P_2$, $P_3$ situated in the environment of the aircraft 10 are defined. Each check point $P_1$, $P_2$, $P_3$ is located on a respective first straight line $D_{P1}$, $D_{P2}$, $D_{P3}$ passing through the reference point Pr. The position of each first line $D_{P1}$, $D_{P2}$, $D_{P3}$ is known relative to the heading 16 in the local reference frame $(X_{10}, Y_{10}, Z_{10})$. For example, the first lines $D_{P1}$, $D_{P3}$ are situated in a horizontal plane of the local reference frame $(X_{10}, Y_{10}, Z_{10})$ forming respective angles $\alpha_1$ and $\alpha_3$ with the direction of the heading 16, and the first line $D_{P2}$ is situated in a vertical plane of the local reference frame $(X_{10}, Y_{10}, Z_{10})$ intersecting the direction of the heading 16, and forming an angle $\alpha_2$ with this direction of the heading 16. The first three lines $D_{P1}$, $D_{P2}$, $D_{P3}$ are not coplanar.

Consequently, the three check points $P_1$, $P_2$, $P_3$ are known in the local reference frame $(X_{10}, Y_{10}, Z_{10})$. Likewise, each first line $D_{P1}$, $D_{P2}$, $D_{P3}$ and each check point $P_1$, $P_2$, $P_3$ can also be transposed to and characterized in the terrestrial reference frame (X, Y, Z).

Preferably, the first lines $D_{P1}$, $D_{P2}$, $D_{P3}$ lie in the field of the at least partial view 8 in perspective.

Nevertheless, the check points $P_1$, $P_2$, $P_3$ may be points taken from a database stored in the memory 3 and thus known in the terrestrial reference frame (X, Y, Z). Each first line $D_{P1}$, $D_{P2}$, $D_{P3}$ passing through the reference point Pr and a respective check point $P_1$, $P_2$, $P_3$ can thus be characterized in the terrestrial reference frame (X, Y, Z).

During a third step 23, a first display function $F_1$ is used to calculate the display coordinates $(a_1,b_1)$, $(a_2,b_2)$, $(a_3,b_3)$ of each check point $P_1$, $P_2$, $P_3$ on the viewing means 2, 6. The first display function $F_1$ is a display function of the at least partial view 8 in perspective of the environment of the aircraft 10 on the viewing means 2, 6.

During a fourth step 24, the inverse $(F_2)^{-1}$ of a second display function $F_2$ and the display coordinates $(a_1,b_1)$, $(a_2,b_2)$, $(a_3,b_3)$ are used to calculate three second straight lines $D_{S1}$, $D_{S2}$, $D_{S3}$ passing through said reference point Pr and through respective ones of the check points $P_1$, $P_2$, $P_3$. The second display function $F_2$ is a display function for displaying the piloting symbology 9 on the viewing means 2, 6. Furthermore, the first display function $F_1$ and the second display function $F_2$ are distinct display functions in order to ensure dissimilarity between the display functions $F_1$ and $F_2$. Furthermore, the first display function $F_1$ has a criticality level DAL C, while the second display function $F_2$ has a criticality level DAL A.

During a fifth step 25, the first and second straight lines $D_{P1}$, $D_{P2}$, $D_{P3}$ and $D_{S1}$, $D_{S2}$, $D_{S3}$ passing through a given check point $P_1$, $P_2$, $P_3$ are compared in order to verify whether the angular difference between the first line $D_{P1}$, $D_{P2}$, $D_{P3}$ and the second line $D_{S1}$, $D_{S2}$, $D_{S3}$ is greater than a predetermined margin.

As a result of various calculation approximations and of using two distinct display functions $F_1$ and $F_2$, a first line $D_{P1}$, $D_{P2}$, $D_{P3}$ and a second line $D_{S1}$, $D_{S2}$, $D_{S3}$ that theoretically both pass through the same check point $P_1$, $P_2$, $P_3$ and the reference point Pr need not coincide exactly. The predetermined margin thus takes account of the various calculation approximations and the use of two distinct display functions $F_1$ and $F_2$.

Finally, during a sixth step 26, the at least partial view 8 in perspective of the environment of the aircraft 10 is defined as being trustworthy providing the first line $D_{P1}$, $D_{P2}$, $D_{P3}$ and the second line $D_{S1}$, $D_{S2}$, $D_{S3}$ passing through the same check point $P_1$, $P_2$, $P_3$ present an angular difference that is less than or equal to the predetermined margin.

Under such circumstances, the first line $D_{P1}$, $D_{P2}$, $D_{P3}$ and the second line $D_{S1}$, $D_{S2}$, $D_{S3}$ passing through the same check point $P_1$, $P_2$, $P_3$ may be considered as coinciding. Consequently, it is deduced that both display functions $F_1$ and $F_2$ are providing results that are consistent. Thus, the second display function $F_2$, which has a criticality level DAL A, constitutes an element contributing to the compliance of the first display function $F_1$ to criticality level DAL A, even though its criticality level is lower.

As a result, the at least partial view 8 in perspective of the environment of the aircraft 10 as determined by the first display function $F_1$ is validated by the second display function $F_2$, which has a criticality level DAL A. It is then possible, in association with other means that are additional and independent, to consider that the at least partial view 8 in perspective of the environment of the aircraft 10 has a criticality level DAL A and can be used by the pilot 20 as an aid in piloting and in navigation.

The at least partial view 8 in perspective is thus displayed normally on the viewing means 2, 6. The pilot 20 of the aircraft 10 then knows that this at least partial view 8 in perspective of the environment outside the aircraft 10 can be used as an aid in piloting and in navigation.

In contrast, when the at least partial view 8 in perspective of the environment outside the aircraft 10 is not trustworthy, i.e. if the angular difference between the first line $D_{P1}$, $D_{P2}$, $D_{P2}$ and the second line $D_{S1}$, $D_{S2}$, $D_{S3}$ passing through the same check point $P_1$, $P_2$, $P_3$ is greater than the predetermined margin, then the display of the at least partial view 8 in perspective on the viewing means 2, 6 is modified so as to inform the pilot 20. For example, the at least partial view 8 in perspective of the outside environment may be shaded or darkened, or indeed not displayed.

Figure 6:
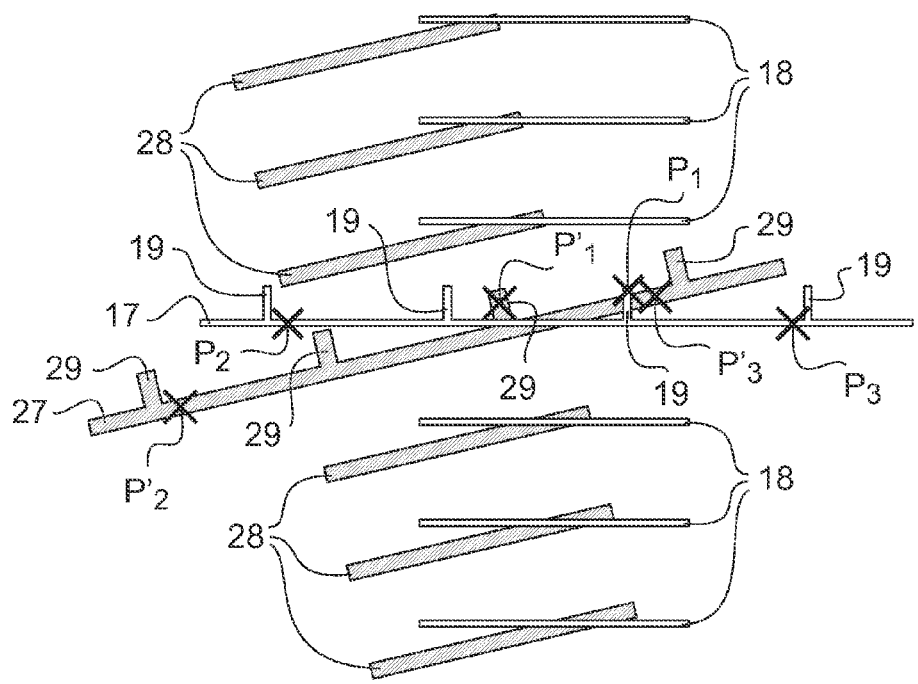
FIGS. 6 and 7 are two views of the viewing means in a variant of the invention.
Figure 7:
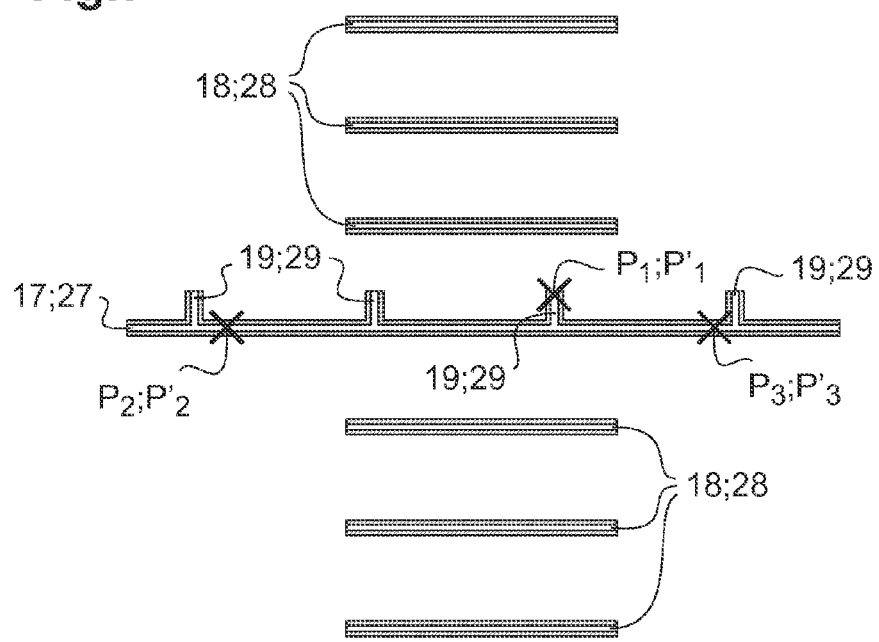

FIGS. 6 and 7 show displays on viewing means 2, 6 in a variant of the invention. In this variant, the display functions $F_1$ and $F_2$ serve to display simultaneously twice over the same elements representing an artificial horizon line 17, 27, attitude marks 18, 28, and heading marks 19, 29 on each artificial horizon line 17, 27. These elements are oriented relative to the heading 16 and to the attitude of the aircraft 10 and they are displayed in a specific color.

In this variant, the check points $P_1$, $P_2$, $P_3$ are particular points. The first check point $P_1$ is situated on the heading of the aircraft 10, i.e. on its roll axis $X_{10}$ in the local reference frame $(X_{10}, Y_{10}, Z_{10})$ tied to the aircraft 10, while the other two check points $P_2$, $P_3$ are situated on an artificial horizon line in the local reference frame $(X_{10}, Y_{10}, Z_{10})$, i.e. the pitching axis $Y_{10}$. The check points $P_1$, $P_2$, $P_3$ are known in this local reference frame $(X_{10}, Y_{10}, Z_{10})$ and can be transposed into the terrestrial reference frame $(X, Y, Z)$. These check points $P_1$, $P_2$, $P_3$ are situated at a first distance L1 from the reference point Pr, which distance is arbitrary but predefined.

The first display function $F_1$ then makes it possible to determine the display coordinates $(a_1,b_1)$, $(a_2,b_2)$, $(a_3,b_3)$ of each check point $P_1$, $P_2$, $P_3$ on the viewing means 2, 6. The first artificial horizon line 17, the first attitude marks 18, and the first heading marks 19 can then be displayed.

The first artificial horizon line 17 is a segment passing through the display coordinates $(a_2,b_2)$, $(a_3,b_3)$ corresponding to the two check points $P_2$, $P_3$, the first attitude marks 18 being equidistant and parallel to the first artificial horizon line 17. The first heading marks 19 are segments that are equidistant and parallel to a direction perpendicular to the first artificial horizon line 17 and they pass through the display coordinates $(a_1,b_1)$ of the first check point $P_1$.

The inverse $(F_2)^{-1}$ of the second display function $F_2$ then makes it possible to determine firstly the second straight lines $D_{S1}$, $D_{S2}$, $D_{S3}$ passing through the reference point Pr and the respective display coordinates $(a_1,b_1)$, $(a_2,b_2)$, $(a_3,b_3)$ corresponding to each of the check points $P_1$, $P_2$, $P_3$. Thereafter, additional points $P'_1$, $P'_2$, $P'_3$ situated on each second line $D_{S1}$, $D_{S2}$, $D_{S3}$ at a second arbitrary but predefined distance L2 from the reference point Pr are determined, the positions of these additional points $P'_1$, $P'_2$, $P'_3$ are known both in the local reference frame $(X_{10}, Y_{10}, Z_{10})$ and in the terrestrial reference frame $(X, Y, Z)$. This second distance L2 may be equal to the first distance L1.

Finally, the first display function $F_1$ serves to determine the additional display coordinates $(a'_1,b'_1)$, $(a'_2,b'_2)$, $(a'_3,b'_3)$ of each additional point $P'_1$, $P'_2$, $P'_3$ on the viewing means 2, 6. The second artificial horizon line 27, the second attitude marks 28, and the second heading marks 29 can then be displayed.

The second artificial horizon line 27 is a segment passing through the additional display coordinates $(a'_2,b'_2)$, $(a'_2,b'_2)$ corresponding to the two additional points $P'_2$, $P'_2$, with the second attitude marks 28 being equidistant and parallel to this second artificial horizon line 27. The second heading marks 29 are segments that are equidistant and parallel to a direction perpendicular to the second artificial horizon line 27 and passing through the additional display coordinates $(a'_1,b'_1)$ of the first additional points $P'_1$.

Thus, by comparing the first and second artificial horizon lines 17 and 27, the first and second attitude marks 18 and 28, and the first and second heading marks 19 and 29, it is possible to verify whether the display functions $F_1$ and $F_2$ are consistent and consequently it is possible to deduce that both display functions $F_1$ and $F_2$ have a criticality level that is equal to the higher of the criticality levels of these two display functions $F_1$ and $F_2$.

In FIG. 6, the viewing means 2, 6 display elements 17, 18, 19 derived from the first display function $F_1$ and elements 27, 28, 29 derived from the second display function $F_2$, which elements are distinct. In other words the results of the display functions $F_1$ and $F_2$ are not mutually consistent.

In FIG. 7, the elements 17, 18, 19 derived from the first display function $F_1$ and the elements 27, 28, 29 derived from the second display function $F_2$ coincide, indicating that in this situation the display functions $F_1$ and $F_2$ are indeed mutually consistent since they give results that are identical.

In addition, the elements 27, 28, 29 derived from the second display function $F_2$ are displayed using thicker lines. Thus, the elements 27, 28, 29 derived from the second display function $F_2$ form margins around the elements 17, 18, 19 displayed by the first display function $F_1$ when both display functions $F_1$ and $F_2$ are consistent.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

For example, the display functions $F_1$ and $F_2$ may be interchanged, the display function $F_1$ being a display function for the piloting symbology 9 and the display function $F_2$ being a display function for the at least partial view 8 in perspective of the environment of the aircraft 10 on the viewing means 2, 6.

Likewise, the criticality levels of each of the display functions $F_1$, $F_2$ may be interchanged and/or may be different.

What is claimed is:

1. A method of contributing to making safe a synthetic graphics representation of the view outside an aircraft, the aircraft having at least one viewing means on which it is possible to display firstly an at least partial view in perspective of the environment of the aircraft and secondly piloting symbology for the aircraft, a roll axis ($X_{10}$) extending from the rear of the aircraft to the front of the aircraft, a yaw axis ($Z_{10}$) extending upwards perpendicularly to the roll axis ($X_{10}$), and a pitching axis ($Y_{10}$) extending from right to left perpendicularly to the roll and yaw axes ($X_{10}$, $Z_{10}$), together forming a local reference frame ($X_{10}$, $Y_{10}$, $Z_{10}$) tied to the aircraft, the method comprising:

determining while the aircraft is in flight at least the heading and the attitude of the aircraft by an attitude and heading reference system (AHRS) of the aircraft and determining a reference point (Pr) of the aircraft;

displaying on the viewing means of the aircraft while the aircraft is in flight for a pilot of the aircraft to view a synthetic graphics representation of the view outside the aircraft representing an at least partial view in perspective of the environment of the aircraft and piloting symbology for the aircraft;

defining at least one check point ($P_1, P_2, P_3$) situated in the environment of the aircraft, each check point ($P_1, P_2, P_3$) co-operating with the reference point (Pr) to form a respective first straight line ($D_{P1}, D_{P2}, D_{P3}$) passing through the reference point (Pr) and the respective check point ($P_1, P_2, P_3$), the position of each first line ($D_{P1}, D_{P2}, D_{P3}$) being known in the local reference frame ($X_{10}, Y_{10}, Z_{10}$) tied to the aircraft;

using a first display function ($F_1$), which takes into account the heading and the attitude of the aircraft determined by the AHRS of the aircraft, to calculate the display coordinates ($a_1,b_1$), ($a_2,b_2$), ($a_3,b_3$) of each check point ($P_1, P_2, P_3$) on the viewing means, wherein each pair of display coordinates ($a_1,b_1$), ($a_2,b_2$), ($a_3,b_3$) represents a respective one of the check points ($P_1, P_2, P_3$) displayed on the viewing means while taking into account the heading and the attitude of the aircraft;

using the inverse $(F_2)^{-1}$ of a second display function ($F_2$), which takes into account the heading and the attitude of the aircraft determined by the AHRS of the aircraft, together with the display coordinates ($a_1,b_1$), ($a_2,b_2$), ($a_3,b_3$) to calculate a second straight line ($D_{S1}, D_{S2}, D_{S3}$) for each check point ($P_1, P_2, P_3$), each second line ($D_{S1}, D_{S2}, D_{S3}$) passing through the reference point (Pr) of the aircraft and the respective check point ($P_1, P_2, P_3$), the first display function ($F_1$) and the second display function ($F_2$) being distinct;

comparing each first line ($D_{P1}, D_{P2}, D_{P3}$) with each second line ($D_{S1}, D_{S2}, D_{S3}$) corresponding to the same check point ($P_1, P_2, P_3$); and defining that the at least partial view in perspective of the environment of the aircraft is trustworthy if each first line ($D_{P1}, D_{P2}, D_{P3}$) and each second line ($D_{S1}, D_{S2}, D_{S3}$) corresponding to the same check point ($P_1, P_2, P_3$) presents an angular difference that is less than or equal to a predetermined margin.

2. The method according to claim 1, wherein each check point ($P_1, P_2, P_3$) is defined in the local reference frame ($X_{10}, Y_{10}, Z_{10}$), and then the position of each check point ($P_1, P_2, P_3$) is calculated in a terrestrial reference frame (X, Y, Z).

3. The method according to claim 1, wherein three check points ($P_1, P_2, P_3$) are defined co-operating with the reference point (Pr) to form three first lines ($D_{P1}, D_{P2}, D_{P3}$) that are not coplanar.

4. The method according to claim 3, wherein the first check point $P_1$ is situated on the roll axis of the aircraft and the check points $P_2, P_3$ are situated on the pitching axis ($Y_{10}$) at a first distance L1 from the reference point Pr, the method further comprising:

displaying a first artificial horizon line, first attitude marks, and first heading marks on the viewing means from the display coordinates ($a_1,b_1$), ($a_2,b_2$), ($a_3,b_3$) of each check point ($P_1, P_2, P_3$), the first artificial horizon line passing through the display coordinates ($a_2,b_2$), ($a_3, b_3$) corresponding to the check points ($P_2, P_3$), the first attitude marks being equidistant and parallel to the first artificial horizon line and the first heading marks (19) being segments that are equidistant and parallel to a direction perpendicular to the first artificial horizon line and passing through the display coordinates ($a_1,b_1$) of the first check point $P_1$;

determining additional points ($P'_1, P'_2, P'_3$) by means of the inverse $(F_2)^{-1}$ of the second display function ($F_2$), the additional points ($P'_1, P'_2, P'_3$) lying on the lines ($D_{S1}, D_{S2}, D_{S3}$) at a second distance L2 from the reference point Pr;

determining additional display coordinates ($a'_1,b'_1$), ($a'_2, b'_2$), ($a'_3,b'_3$) of each additional point ($P'_1, P'_2, P'_3$) on the viewing means by using the first display function ($F_1$); and displaying a second artificial horizon line, second attitude marks, and second heading marks on the viewing means on the basis of the additional display coordinates ($a'_1,b'_1$), ($a'_2,b'_2$), ($a'_3,b'_3$), the second artificial horizon line passing through the additional display coordinates ($a'_2,b'_2$), ($a'_3,b'_3$) corresponding to the additional points ($P'_2, P'_3$) the second attitude marks being equidistant and parallel to the second artificial horizon line, and the second heading marks being segments parallel to a direction perpendicular to the second artificial horizon line and passing through the additional display coordinates ($a'_1,b'_1$) of the first additional points $P'_1$.

5. The method according to claim 1, wherein each check point ($P_1, P_2, P_3$) is characterized by a first line ($D_{P1}, D_{P2}, D_{P3}$) positioned relative to the longitudinal row axis ($X_{10}$) and passing through the reference point (Pr), and by a distance L from the reference point (Pr).

6. The method according to claim 1, wherein the reference point (Pr) is characterized by first coordinates in a terrestrial reference frame (X, Y, Z) and each check point ($P_1, P_2, P_3$) is a point known from a database having second coordinates that are known in the terrestrial reference frame (X, Y, Z), the first line ($D_{P1}, D_{P2}, D_{P3}$) corresponding to a check point ($P_1, P_2, P_3$) being determined from the first coordinates of the reference point (Pr) and from the second coordinates of the check point ($P_1, P_2, P_3$).

7. The method according to claim 1, wherein each check point ($P_1, P_2, P_3$) is selected to be in the field of the at least partial view in perspective.

8. The method according to claim 1, wherein each check point ($P_1, P_2, P_3$) is selected so as to scan the at least partial view in perspective in a given time interval.

9. The method according to claim 1, wherein, when the at least partial view in perspective is not trustworthy, the display of the at least partial view in perspective on the viewing means is modified in order to inform a pilot of the aircraft.

10. The method according to claim 1, wherein the step of displaying on the viewing means includes displaying the at least partial view in perspective of the environment of the aircraft on the viewing means using the first display function ($F_1$) and displaying the piloting symbology on the viewing means using the second display function ($F_2$).

11. The method according to claim 1, wherein the step of displaying on the viewing means includes displaying the piloting symbology on the viewing means using the first display function ($F_1$) and displaying the at least partial view in perspective of the environment of the aircraft on the viewing means using the second display function ($F_2$).

12. The method according to claim 1, wherein one of the display functions ($F_1, F_2$) has a safety level higher than the other display function ($F_1, F_2$).

13. The method according to claim 1, wherein one of the display functions ($F_1, F_2$) has a criticality level that is DAL A or DAL B.

14. The method according to claim 1, wherein the reference point (Pr) is the reference point of the display of the synthetic graphics representation of the view outside the aircraft.

15. A synthetic vision display device of an aircraft, the synthetic vision display device comprising:
- at least one viewing means, at least one memory, and at least one calculator, the memory storing at least one database of the environment of the aircraft and calculation instructions, the synthetic vision display device serving to display on the at least one viewing means firstly an at least partial view in perspective of the environment of the aircraft and secondly piloting symbology, the synthetic vision display device being suitable for being connected to at least one positioning means of the aircraft enabling at least the heading and the attitude of the aircraft to be determined together with a reference point (Pr) of the aircraft, a roll axis ($X_{10}$) extending from the rear of the aircraft to the front of the aircraft, a yaw axis ($Z_{10}$) extending upwards perpendicularly to the roll axis ($X_{10}$), and a pitching axis ($Y_{10}$) extending from right to left perpendicularly to the roll and yaw axes ($X_{10}$, $Z_{10}$), thereby forming a local reference frame ($X_{10}$, $Y_{10}$, $Z_{10}$) tied to the aircraft;
- wherein the synthetic vision display device is capable of performing the method of contributing to making safe a synthetic graphics representation of the outside view of an aircraft according to claim 1 in order to make safe the display of the at least partial view in perspective of the environment of the aircraft.

16. An aircraft comprising:
- a synthetic vision display device and at least one positioning means, wherein the synthetic vision display device is a device according to claim 15.

\* \* \* \* \*